United States Patent
Doria et al.

(10) Patent No.: US 10,089,249 B2
(45) Date of Patent: Oct. 2, 2018

(54) IN-PACKAGE STORING OF DATA FOR AN ELECTRONIC DEVICE

(71) Applicant: KYOCERA Document Solutions Inc., Osaka (JP)

(72) Inventors: Steve A. Doria, Los Angeles, CA (US); John J. Manatt, Granada Hills, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 459 days.

(21) Appl. No.: 14/825,543

(22) Filed: Aug. 13, 2015

(65) Prior Publication Data
US 2017/0046284 A1    Feb. 16, 2017

(51) Int. Cl.
| | |
|---|---|
| *G06F 13/16* | (2006.01) |
| *G06F 13/10* | (2006.01) |
| *G06F 13/40* | (2006.01) |
| *G06F 13/42* | (2006.01) |

(52) U.S. Cl.
CPC ............ *G06F 13/102* (2013.01); *G06F 13/16* (2013.01); *G06F 13/4068* (2013.01); *G06F 13/4282* (2013.01)

(58) Field of Classification Search
CPC .... G06F 13/102; G06F 13/16; G06F 13/4068; G06F 13/4282
USPC .......................................................... 710/74
See application file for complete search history.

(56) References Cited

U.S. PATENT DOCUMENTS

| | | | | |
|---|---|---|---|---|
| 8,334,927 B2* | 12/2012 | Castano | ................... | H04N 5/44 348/552 |
| 2006/0107259 A1* | 5/2006 | Lin | ........................ | G06F 13/102 717/169 |
| 2009/0115202 A1* | 5/2009 | Terry | ...................... | E05B 39/02 292/327 |
| 2010/0218465 A1* | 9/2010 | Takaya | ................... | G06Q 30/02 53/467 |
| 2011/0018707 A1* | 1/2011 | Dobson | .................. | A45C 13/18 340/539.13 |
| 2012/0235791 A1* | 9/2012 | Donlan | .................. | G06Q 10/08 340/10.1 |
| 2013/0254440 A1* | 9/2013 | Toivanen | ................ | G06F 13/10 710/63 |
| 2013/0258195 A1* | 10/2013 | Chung | ............... | H04N 21/4183 348/554 |
| 2013/0323560 A1* | 12/2013 | Choo | ................... | H01M 2/1077 429/99 |

(Continued)

*Primary Examiner* — Christopher Shin
(74) *Attorney, Agent, or Firm* — McDonnell Boehnen Hulbert & Berghoff LLP

(57) ABSTRACT

An apparatus, shipping container, and system for in-package storing of data for an electronic device are disclosed. In one example, the apparatus comprises an electronic device that has a housing and is packaged in a shipping container that substantially encloses the electronic device. The housing includes a first communication interface and the shipping container includes a second communication interface. The second communication interface is in electrical communication with the first communication interface such that power and data signals can be communicated via the first and second communication interfaces between the electronic device and another electronic device located outside the shipping container.

21 Claims, 5 Drawing Sheets

(56) References Cited

U.S. PATENT DOCUMENTS

| | | | | |
|---|---|---|---|---|
| 2014/0108870 A1* | 4/2014 | Aravindhan | ......... | H01R 31/005 |
| | | | | 714/43 |
| 2014/0330987 A1* | 11/2014 | Schuh | ................. | G06F 13/4068 |
| | | | | 710/8 |
| 2015/0289015 A1* | 10/2015 | Jung | .................. | H04N 21/4181 |
| | | | | 725/132 |
| 2016/0141904 A1* | 5/2016 | Zhijian | ................ | H02J 7/0054 |
| | | | | 320/103 |
| 2017/0095405 A1* | 4/2017 | Afsarifard | ............. | A61J 7/0418 |

* cited by examiner

IN-PACKAGE STORING OF DATA FOR AN ELECTRONIC DEVICE

BACKGROUND

An electronic device will typically include memory that can hold various data and programs for operating the electronic device. In this regard, the electronic device may be initially programmed with certain firmware and packaged in a shipping container for delivery to a customer. However, a need may arise to update the firmware prior to the shipment, such as to, e.g., ensure proper operation of the electronic device once the device is unpackaged and powered up for operation.

Often, though, once the electronic device is packaged in the shipping container, it may be difficult and/or cost/time prohibitive to remove the device from the shipping container, open the shipping container, or otherwise gain access to the device, in order to update the firmware. This is particularly true in a case where numerous electronic devices have to be programmed with an updated firmware. Additionally, gaining access to the electronic device may be particularly challenging when the device is of relatively large size, such as in the case of certain professional-grade image forming devices (e.g., a printer/copier or a multifunctional peripheral (MFP) device).

Therefore, what is desirable is an apparatus that allows for storing data in a memory of an electronic device that has been packaged in a shipping container, without the need to disturb the shipping container and the electronic device situated therein.

SUMMARY

The present disclosure provides ways to alleviate the shortcomings discussed above. More particularly, in one aspect, an apparatus comprising an electronic device that has a housing and is packaged in a shipping container that substantially encloses the electronic device is disclosed. The housing includes a first communication interface and the shipping container includes a second communication interface. Further, the second communication interface is in electrical communication with the first communication interface such that power and data signals can be communicated via the first and second communication interfaces between the electronic device and another electronic device located outside the shipping container.

In another aspect, a shipping container for packaging an electronic device having a housing including a first communication interface is disclosed. The shipping container comprises a second communication interface electrically connectable to the first communication interface. Further, in the disclosed shipping container, when the electronic device is packaged in the shipping container, (i) the shipping container substantially encloses the electronic device, and (ii) the second communication interface is in electrical communication with the first communication interface such that power and data signals can be communicated via the first and second communication interfaces between the electronic device and another electronic device located outside the shipping container.

In yet another aspect, a system is disclosed. The system comprises (i) a first electronic device that has a housing and is packaged in a shipping container that substantially encloses the first electronic device, and (ii) a second electronic device located outside the shipping container. The housing of the first electronic device includes a first communication interface, the shipping container includes a second communication interface, and the second communication interface is in electrical communication with the first communication interface such that power and data signals can be communicated via the first and second communication interfaces between the first electronic device and the second electronic device.

These as well as other aspects, advantages, and alternatives will become apparent to those of ordinary skill in the art by reading the following detailed description with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Example System and Overview

Figure 1:
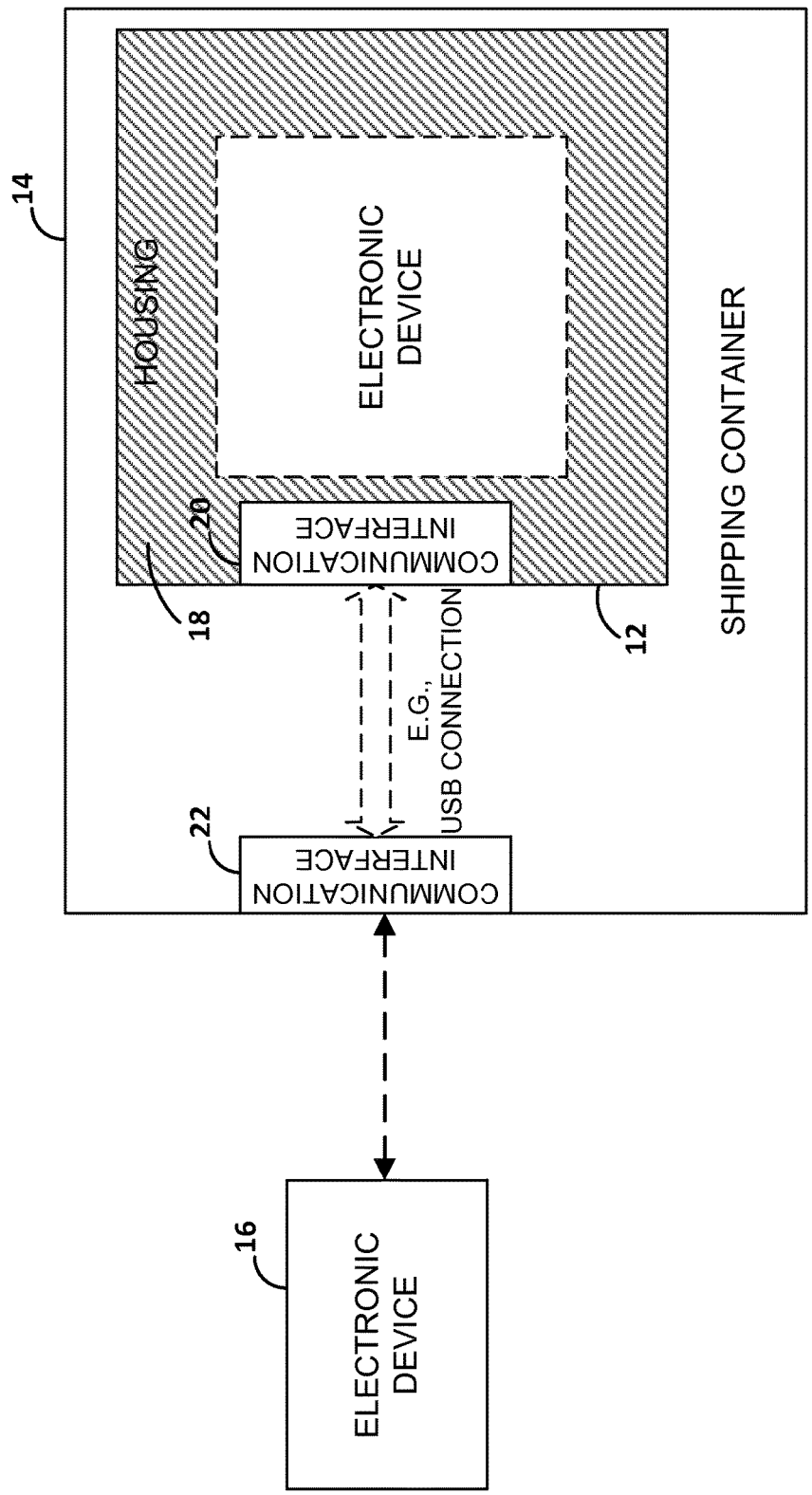
FIG. 1 illustrates an example of a system arrangement in accordance with an illustrative embodiment of the present disclosure.

FIG. 1 depicts an example of a system arrangement 10 in accordance with an illustrative embodiment of the present disclosure. As illustrated in FIG. 1, the system arrangement 10 comprises an electronic device 12 that is packaged in a shipping container 14 substantially enclosing the electronic device 12 and an electronic device 16 located outside the shipping container 14.

As further shown in FIG. 1, the electronic device 12 has a housing 18 that houses the electronic device 12. The housing 18 includes a communication interface 20 and the shipping container 14 includes a communication interface 22.

The electronic device 12 may be any type of an electronic device. By way of example, the electronic device 12 may be an image forming device, examples of which include a dedicated printer/copier or a multifunctional peripheral (MFP) device that typically performs functions of a printer, a copier, and a scanner.

In general, the housing 18 of the electronic device 12 can be made of any type of an enclosure that houses various electronic and operational components of the electronic device 12. It can be made, e.g., of plastic-based material(s), metal-based material(s), or combination of both. As one example, in the case of the electronic device 12 being an image forming device (e.g., a professional-grade image forming device), the housing 18 may include a plastic enclosure with a metal backing/casing for additional rigidity.

In accordance with the illustrative embodiment, the housing 18 includes the communication interface 20, which may be built into or secured within the housing 18 via any suitable means. The communication interface 20 may be any type of interface via which data and power signals can be communicated to the electronic device 12 situated in the housing 18. In this regard, the communication interface 20 may be a dedicated communication interface or, if appropriate, may be a communication interface that the housing 18 may be pre-equipped with. As an example, housings of many electronic devices often include various connection/communication ports, such as a Universal Serial Bus (USB) port, via which various signals can be communicated (i.e., transmitted/received) between the electronic device and an external device (e.g., a host computer, a peripheral (e.g., an external flash drive, such as a USB flash drive, etc.).

To illustrate, some image forming devices come equipped with a USB port that allows a USB flash drive to be connected thereto to transfer data for storage in a non-volatile memory of the image forming device. Typically, a need for such data transfer may exist if initial firmware stored in the memory needs to be updated or installed for the image forming device to operate properly once it is delivered to a customer. (Note that the terms "firmware" and "software" may be used herein interchangeably).

To illustrate, in a typical operation, the following procedures may be followed to update the contents of a non-volatile memory in the electronic device 12 once the device is delivered and unpackaged from the shipping container 14. First, while the device is powered down, a USB flash drive containing firmware update files is plugged into the product's USB port. When the device is powered up, it supplies power to power up the USB flash drive. Once the USB flash drive is powered up, the firmware update files are transferred to the memory of the device. Then, after the firmware update is completed, the device can be powered down and the USB flash drive unplugged. Subsequently, when the device is powered up, the software update will take an effect.

One problem with the software update operation described above is that it requires the electronic device 12 to be powered up in order to provide power to the USB flash drive and enable data transfer of data stored on the USB flash drive. However, as discussed above, once the electronic device 12 is packaged in the shipping container 14 for delivery to a customer, gaining access to that device may be difficult in order to update firmware. Further, doing so for numerous electronic devices, as in a factory or production environment, can be time and/or cost prohibitive. Also, physical size of the electronic device 12 may be another limiting factor.

In accordance with the illustrative embodiment, the shipping container 14 includes the communication interface 22. The communication interface 22 is in electrical communication with the communication interface 20 such that power and data signals can be communicated via the communication interfaces 20 and 22 between the electronic device 12 and the electronic device 16 located outside the shipping container 14. In this regard, the electronic device 16 may supply at least one power signal and a plurality of data signals to be communicated to the electronic device 12 via the communication interfaces 20 and 22.

Further, in the illustrative embodiment, the electronic device 12 includes memory (e.g., a non-volatile memory) and the at least one power signal and the plurality of data signals include signals for causing data to be stored in the memory. For instance, a power signal could be used to power up the memory and a controller controlling the memory both included in the electronic device 12, while the data signals could include signals carrying data for storage in the memory, as well as programming signals for the controller controlling the memory. Accordingly, even if the electronic device 12 is packaged inside the shipping container 14 and is in a powered-down state, power signal(s) can be used to power up only those device components needed to store data in the memory of the electronic device 12.

Note that, as defined herein, the term "shipping container" refers to any type of container that substantially encloses an electronic device situated therein and is adapted for shipment (e.g., transport/movement) of the electronic device from one location (e.g., a factory/manufacturing facility or a supplier) to another location (e.g., customer's premises) and any storage and/or handling associated therewith. Some examples of a shipping container include a box (e.g., a wooden, plastic, and/or paper box), a crate, a case, and/or plastic wrap coupled with any associated supporting structure. Also, as used herein, a shipping container can include cushioning, carrying handle(s), lock(s), pallet(s), etc., and/or other parts that may be used for protecting and/or facilitating handling of contents.

Each of the communication interfaces 20 and 22 could be configured to include any suitable connector or a combination of connectors and any additional circuitry to allow for transfer of power and data signals. Preferably, the communication interface 20 and the communication interface 22 are electrically connectable with each other via a wired connection, such as a cable. For example, each of those interfaces may be a USB interface in the form of a suitable USB connector. The two USB connectors could then be electrically connected with each other via a USB cable. As known in the art, a USB connection provides four lines: two lines for supplying power (more specifically, high and ground voltage lines) and a twisted-pair of differential lines for carrying data. However, other type of wired connections suitable for carrying both power and data signals may be possible as well.

Additionally, in an alternative embodiment, the communication interface 20 and the communication interface 22 may be coupled with each other via a wireless connection such that a communication of power and data could occur wirelessly. As one example, each of the communication interfaces 20 and 22 could include two separate parts: one part for communicating power wirelessly via, e.g., magnetic inductive coupling or magnetic resonant coupling from a power source, and another part for communicating data wirelessly using any suitable wireless protocol for short-range communications (e.g., Bluetooth® or 802.11). In this regard, the two parts may be separate from each other and installed at different parts of the housing 18 and the shipping container 14, respectively. For instance, a power-supplying part of the communication interface 22 (e.g., a magnetic resonant circuit receiving power for transmission from a power supply) may be included in a base of the shipping container 14 (e.g., a base in the form of pallet(s)), while a power-receiving part of the communication interface 20 may be included in a bottom portion of the housing 18 that is situated over the base of the shipping container 14.

If the communication interface 20 and the communication interface 22 are electrically connected with each other via a wired connection, once the shipping container 14 is open to gain access to the electronic device 12 situated therein, the wired connection between the interfaces may be removed (e.g., a USB cable can be disconnected from the communication interface 20 of the electronic device 12). In this regard, the shipping container 14 may include a visual warning, directing a user to open the packaging in a prescribed manner to avoid a potential damage to either the communication interface 22 in the shipping container 14 and/or the communication interface 20 in the housing 18 of the electronic device 12.

Further, in accordance with the illustrative embodiment, the electronic device 16 that is located outside the shipping container 14 may be any one or more electronic devices capable of communicating power and data signals with the electronic device 12. In one example, the electronic device 16 could be a personal computer, a laptop, or a dedicated programming device (e.g., a dedicated programmer for programming an on-board memory chip, as known to those skilled in the art) capable of communicating power and data signals to/with a controller controlling data writing to programmable memory inside the electronic device 12. Further, in some embodiments, the electronic device 16 may include a separate power supply and/or another form of a source of electrical energy providing the electrical energy to the power supply for supplying power to the electronic device 12 via the communication interfaces 20 and 22 (e.g., in the case of a wireless power transmission, as noted above).

Advantageously, with benefits of the present disclosure, once the electronic device 12 is packaged in the shipping container 14, it is not necessary to disturb the shipping container and the electronic device 12 situated therein by removing the electronic device 12 from the shipping container 14, opening the shipping container 14, or otherwise gaining access to the electronic device 12. Instead, in order to update, for example, firmware stored in the memory of the electronic device 12, the electronic device 16 located outside the shipping container 14 may supply necessary power signal and data signals to be communicated to the electronic device 12 via the communication interfaces 20 and 22. In this regard, the communication interface 22 is in electrical communication with the communication interface 20 such that the power and data signals can be communicated via those interfaces between the electronic device 12 and the electronic device 16.

Accordingly, in a case where numerous electronic devices have to be programmed with an updated firmware, the update process can be substantially simplified. As one example, in a mass production setting, establishing a connection between the electronic device 16 (e.g., a personal computer, a laptop, or a dedicated programming device) and the communication interface 22 in the shipping container 14 can be automated.

2. Example Electronic Device

Figure 2:
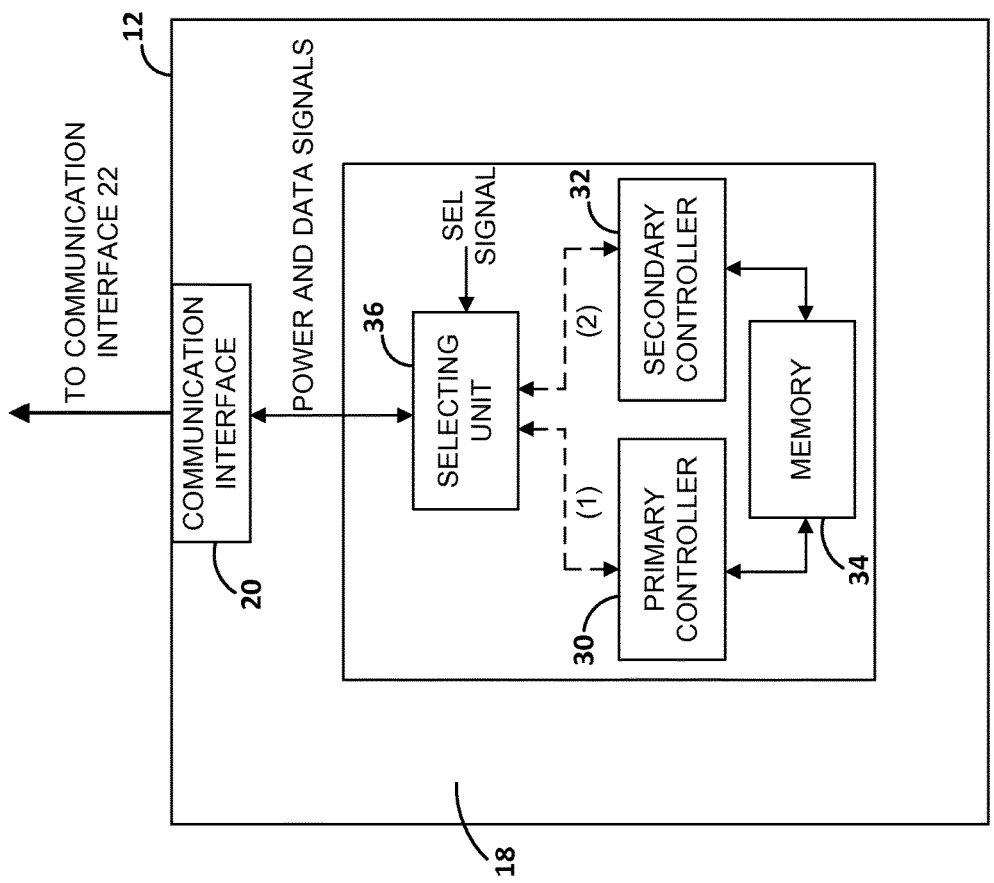
FIG. 2 illustrates one electronic device of the system arrangement of FIG. 1 in more detail.

FIG. 2 illustrates the electronic device 12 in more detail. As depicted in FIG. 2, the electronic device 12 includes a primary controller 30, a secondary controller 32, memory 34, and a selecting unit 36. In the illustrative embodiment, the primary controller 30 may be a controller that controls (i.e., reads data from and/or writes data to) the memory 34 when the electronic device 12 is powered up.

As an example, the primary controller 30 may be at least one central processing unit (CPU) that, during normal operation of the electronic device 12, controls the memory 34. For instance, the memory 34 may initially have stored thereon certain firmware, and when the electronic device 12 is in a powered-up state, any firmware update may be done via the primary controller 30. Further, although not shown, the electronic device 12 may include additional hardware to facilitate a connection to the memory 34 from both the primary controller 30 and the secondary controller 32. Since both controllers will likely share a connection to similar inputs on the memory 34, additional hardware (e.g., decoupling capacitors, etc.) may be needed to alleviate potential circuit loading and/or other issues associated with in-circuit programming of memory chips.

The memory 34 is preferably a non-volatile type of data storage, such as an electrically erasable programmable read-only memory (EEPROM) or a negative-AND (NAND) flash memory that maintains stored data even after power to the electronic device 12 is turned off or interrupted in some way. This way, the electronic device 12 may be temporarily powered up to update data stored in the memory 34 and then powered down once the data transfer/update is completed, without losing an update to the firmware. However, it is possible that the principles of the present disclosure may be applied to other types of memory in order to store data in such memory without a need to power up the entire electronic device in which the memory is included.

According to the illustrative embodiment, the secondary controller 32 controls the memory 34 when the electronic device 12 is powered down. The secondary controller 32 may include any suitable controller including, e.g., one or more processors (e.g., general purpose processors and/or dedicated processors (e.g., application specific integrated circuits (ASICs)) or digital signal processors (DSPs)) that can be programmed to cause storage of data in the memory 34. One example of such suitable controller is, e.g., ST72681 controller from STMicroelectronics. This controller is used in USB 2.0 flash drive applications, and can control up to four NAND flash memory chips via its ports. It has a processing unit and internal read-only memory (ROM) and random-access memory (RAM) for storage of programs and data. It also includes a USB interface for a USB connection.

The secondary controller 32 may be configured to receive power and data signals transmitted from the electronic device 16 via the communication interfaces 20 and 22. The data signals could include signals carrying data (e.g., a software update) for storage in the memory, as well as programming signals in the form of, e.g., suitable program instructions (e.g., machine language instructions or any other higher-level programming instructions) executable by the secondary controller 32, directing the controller to store the data in the memory 34. The secondary controller 32 may, in response, control the memory 34 to cause storage of the data in the memory 34.

As shown in FIG. 2, the electronic device 12 also includes the selecting unit 36 that selectively causes the communication interface 20 to be communicatively coupled to either the primary controller 30 or the secondary controller 32 via either path (1) or path (2), as depicted in FIG. 2. In this regard, when the selecting unit 36 couples the communication interface 20 in the housing 18 to the secondary controller 32, the secondary controller 32 will be configured to receive the signals for causing data to be stored in the memory 34 and responsively control the memory 34 to store the data in the memory 34. As described above, the memory 34 may already have some firmware for the electronic device 12 stored thereon, and the data may include an update to that firmware. In other embodiments, the secondary controller 32 may be instructed via suitable program code to erase/overwrite data stored in the memory 34 in order to store brand new data in the memory 34.

The selecting unit 36 may be configured to select either path (1) or path (2) in response to a select control signal (denoted as "SEL" signal in FIG. 2) provided to the selecting unit 36. The SEL signal may be a voltage signal corresponding to a logical signal "1" (e.g., a high voltage signal) or a logical signal "0" (e.g., a low voltage signal), depending on whether the electronic device 12 is powered up or not.

To illustrate, when the electronic device 12 is in a powered-down state, as in the case of the electronic device 12 being packaged in the shipping container 14, the SEL signal (e.g., a 0V voltage signal) may cause the selecting unit 36 to couple the communication interface 20 to the secondary controller 32. This way, power and data signals sent from the electronic device 16 via the communication interfaces 20 and 22 may be communicated via path (2) to the secondary controller 32. Power signal(s) may be used to power up the secondary controller 32 and the memory 34. In this regard, in one example, appropriate power level to power up the memory 34 may be provided via the secondary controller 32, as in the case of the example ST72681 controller noted above.

On the other hand, when the electronic device 12 is in a powered-up state, as in the case of the electronic device 12 being removed from the shipping container 14 and the communication interfaces 20 and 22 being electrically disconnected from each other, the SEL signal (e.g., a positive voltage signal) may cause the selecting unit 36 to couple the communication interface 20 to the primary controller 30. Accordingly, the primary controller 30 may communicate with any external device coupled to the communication interface 20.

By way of example, in the case of the electronic device 12 being an image forming device, the communication interface 20 may be a USB port that the image forming device comes pre-equipped with to allow a USB flash drive to be connected thereto in order to transfer data for storage in the memory 34. As discussed above, typically, a need for such data transfer may exist if initial firmware stored in the memory 34 needs to be updated or installed for the image forming device to operate properly once it is delivered to a customer. Hence, when the communication interface 20 is communicatively coupled with the primary controller 30 via the selecting unit 36, any such data transfer may be accomplished by connecting an external USB flash drive to the communication interface 20. The external USB flash drive may be powered up via the primary controller 30 or, although not explicitly shown in FIG. 2, the selecting unit 36 may have its power input(s)/output(s) coupled with a suitable power source within the electronic device 12.

Figure 3:
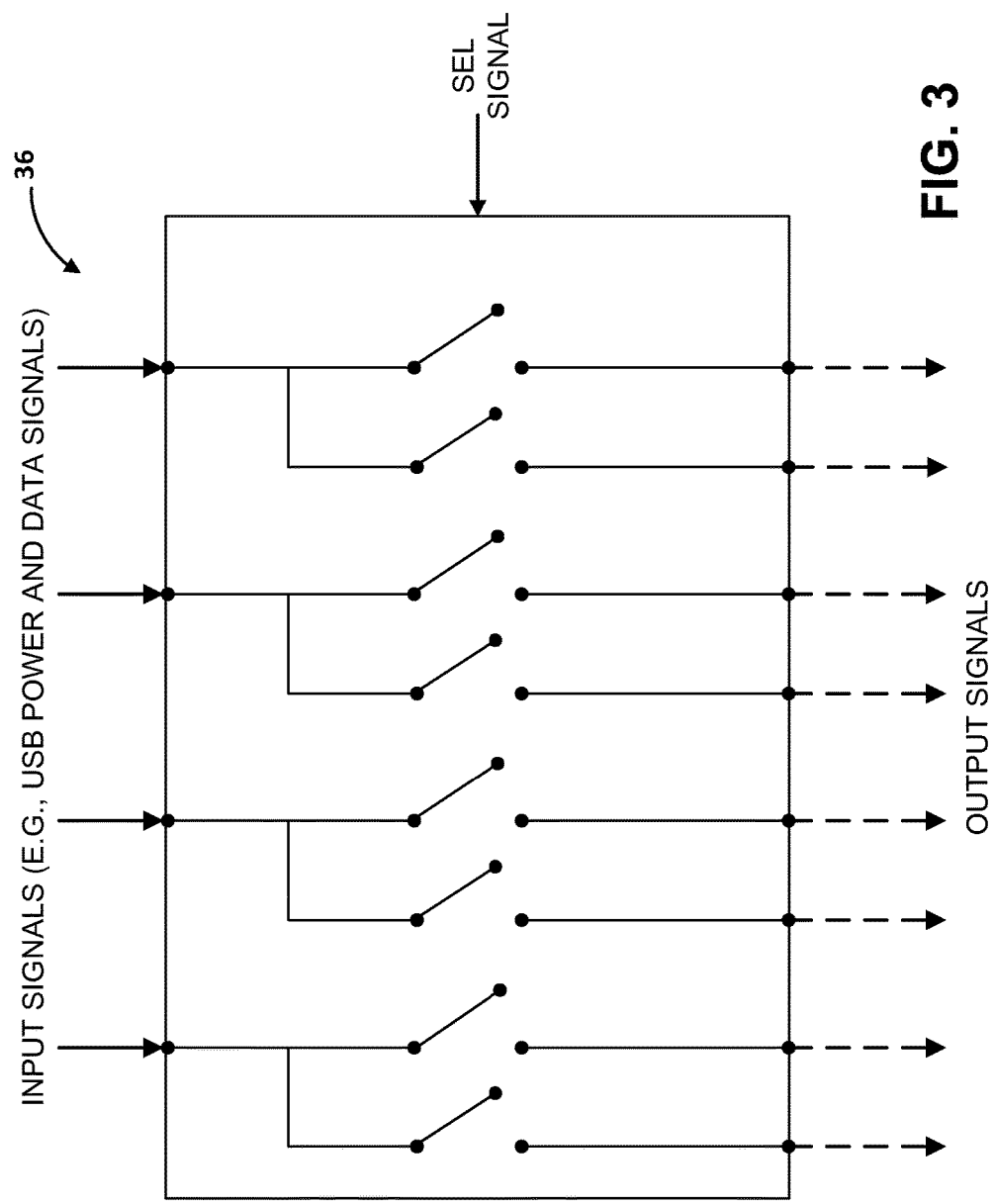
FIG. 3 illustrates a conceptual diagram of a selecting unit included in the electronic device of FIG. 2.
Figure 4A:
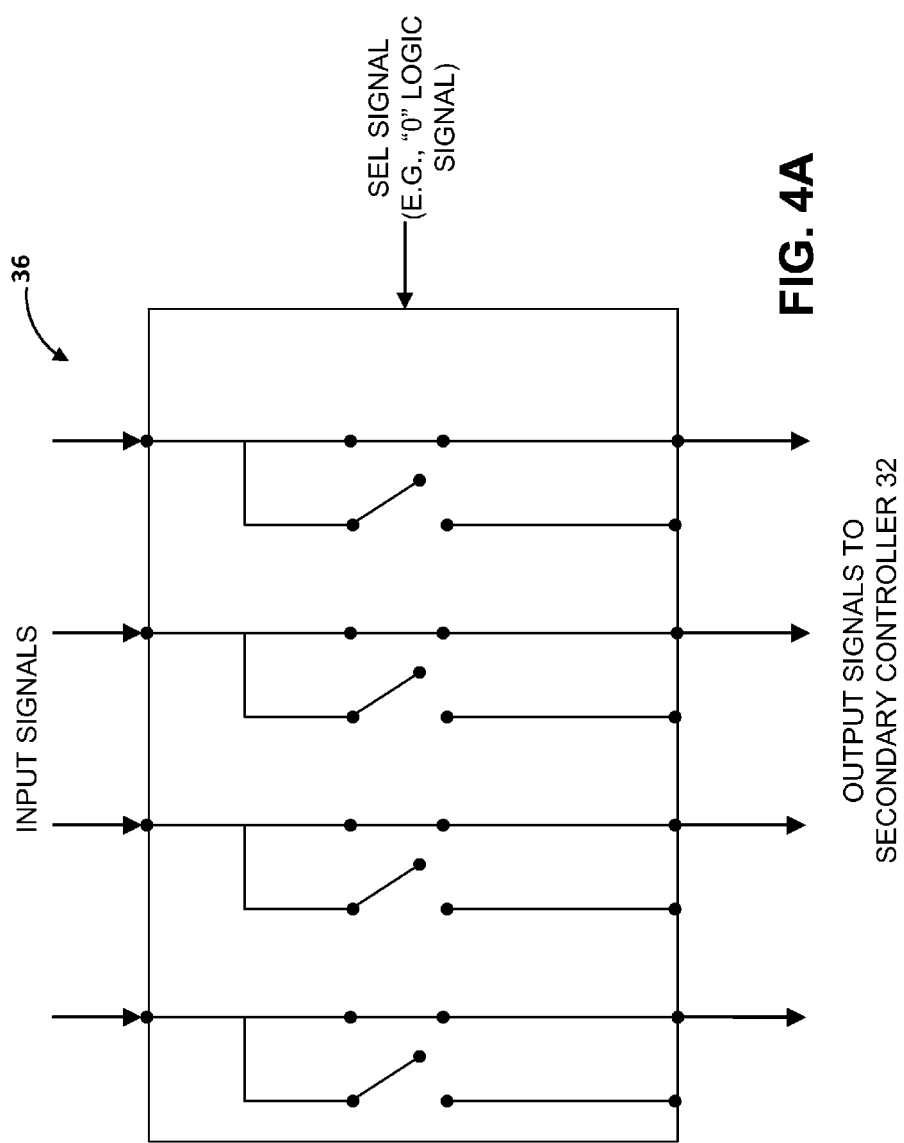
FIG. 4A illustrates an operation of the selecting unit of FIG. 3 in response to a first select control signal.
Figure 4B:
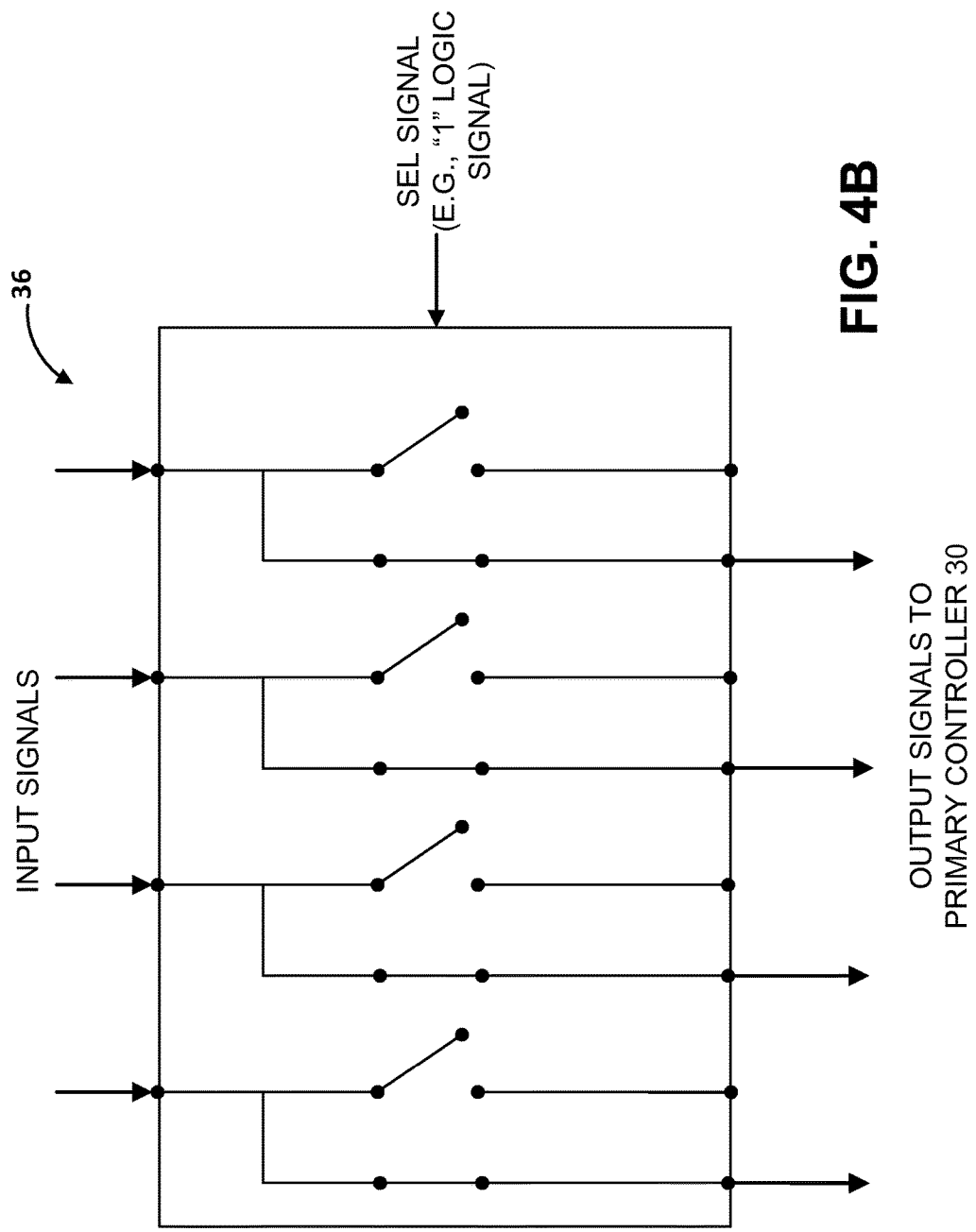
FIG. 4B illustrates an operation of the selecting unit of FIG. 3 in response to a second select control signal.

FIG. 3 illustrates a conceptual diagram of the selecting unit 36. In accordance with the illustrative embodiment, the selecting unit 36 may be implemented in the form of a logical switching device, such as any suitable type of one or more analog switches (e.g., a multi input/output switch(es) or a multiplexer/demultiplexer switch(es)). Those skilled in the art will appreciate that various types of switching devices (e.g., chips) suitable for implementing the selecting unit 36 are readily available. In one example, as shown in FIG. 4A, in response to the SEL signal being low, signals inputted to the selecting unit 36 via the communication interface 20 (e.g., four signals on a USB connection) may be coupled to the secondary controller 32. On the other hand, as shown in FIG. 4B, in response to the SEL signal being high, signals inputted to the selecting unit 36 via the communication interface 20 may be coupled to the primary controller 30.

Although not explicitly shown in FIG. 2, the SEL signal may be provided by any suitable detection circuit that detects whether the electronic device 12 is powered up or powered down. In one example, such detection circuit may include a diode-based switch providing either a low or high voltage signal onto the SEL signal line, depending on whether or not main power is supplied to the electronic device 12. Those skilled in the art will know how to provide such or any other suitable detection circuit.

Further, in the case of the communication interfaces 20 and 22 being electrically connectable to each other via a USB connection (e.g., a USB cable of either A or B type), the communication interface 22 included in the shipping container 14 may take the form of two back-to-back female/male-type USB connectors. For instance, each USB connector can be a USB A or B type solder connector joined together in a back-to-back configuration. In another example, the communication interface 22 may take the form of a commercially available USB coupler adapter (e.g., a USB 2.0 female-to-female coupler adapter). The communication interface 22 may be built into, attached to, or integrated with the shipping container 14 by any appropriate means. Accordingly, one end of the communication interface 22 may be connected via a USB connection to the communication interface 20 in the housing 18, while another end of the communication interface 22 may be connected via a USB connection to the electronic device 16 having a corresponding USB port.

Although illustrative embodiments have been described above, some variations are possible.

To illustrate, in one embodiment, the secondary controller 32 may be programmed to recognize whether the electronic device 16 is an authorized programming device to avoid rogue programming devices attempting to program the memory 34 with unauthorized software. In another embodiment, the communication interface 22 in the shipping container 22 may be coverable (e.g., with a snap-on cover) to avoid damage to the communication interface 22.

3. Conclusion

Various embodiments of the present invention have been described above. Those skilled in the art will understand, however, that changes and modifications may be made to these embodiments without departing from the true scope and spirit of the present invention, which is defined by the claims.

The invention claimed is:
1. An apparatus comprising:
a first electronic device having a housing, the first electronic device packaged in a shipping container that substantially encloses the first electronic device, wherein the first electronic device is a multifunctional peripheral device including one or more of a printer, a copier, and a scanner,
wherein,
the housing includes a first communication interface,
the shipping container includes a second communication interface, and
the second communication interface is in electrical communication with the first communication interface such that power and data signals can be communicated via the first and second communication interfaces between the first electronic device and a second electronic device located outside the shipping container, the first electronic device comprises a primary controller, a secondary controller, and a selecting unit, the selecting unit is configured to cause the first communication interface to be communicatively coupled to the primary controller or the secondary controller, the secondary controller is configured to receive the power and the data signals, and when the first electronic device is in a powered-down state, the selecting unit is configured to cause the first communication interface to be communicatively coupled to the secondary controller, the power and the data signals are sent to the secondary controller, the secondary controller is powered-up by the sent power, and the secondary controller stores the sent data signals.

2. The apparatus of claim 1, wherein the first communication interface and the second communication interface are electrically connected with each other via a cable.

3. The apparatus of claim 1, wherein:

the first communication interface is a first Universal Serial Bus protocol (USB) interface, and the second communication interface is a second USB interface.

4. The apparatus of claim 1, wherein the second electronic device supplies at least one power signal and a plurality of data signals to be communicated to the first electronic device via the first and second communication interfaces.

5. The apparatus of claim 4, wherein:

the first electronic device includes memory, and the at least one power signal and the plurality of data signals include signals for causing data to be stored in the memory.

6. The apparatus of claim 5, wherein the memory is a non-volatile memory.

7. The apparatus of claim 6, wherein the non-volatile memory is an EEPROM memory.

8. The apparatus of claim 6, wherein the non-volatile memory is a NAND flash memory.

9. The apparatus of claim 5, wherein the memory has stored thereon firmware for the first electronic device, and wherein the data includes an update to the firmware.

10. The apparatus of claim 5, wherein the first electronic device further includes:

a first controller that controls the memory when the first electronic device is powered up; and a second controller that controls the memory when the first electronic device is powered down.

11. The apparatus of claim 10, wherein the first electronic device further includes:

a selecting unit that selectively causes the first communication interface to be communicatively coupled to either the first controller or the second controller.

12. The apparatus of claim 11, wherein, when the first communication interface is communicatively coupled to the second controller, the second controller is configured to receive the signals for causing data to be stored in the memory and to cause the data to be stored in the memory.

13. An apparatus comprising:

a first communication interface in a housing of a first electronic device, the first electronic device packaged in a shipping container that substantially encloses the first electronic device, wherein the first electronic device is a multifunctional peripheral device including one or more of a printer, a copier, and a scanner; and a second communication interface in the shipping container, wherein the second communication interface is in electrical communication with the first communication interface such that power and data signals can be communicated via the first and second communication interfaces between the first electronic device and a second electronic device located outside the shipping container, wherein the first electronic device comprises a primary controller, a secondary controller, and a selecting unit, the selecting unit is configured to cause the first communication interface to be communicatively coupled to the primary controller or the secondary controller, the secondary controller is configured to receive the power and the data signals, and when the first electronic device is in a powered-down state, the selecting unit is configured to cause the first communication interface to be communicatively coupled to the secondary controller, the power and the data signals are sent to the secondary controller, the secondary controller is powered-up by the sent power, and the secondary controller stores the sent data signals.

14. The apparatus of claim 13, wherein the first communication interface and the second communication interface are electrically connected with each other via a cable.

15. The apparatus of claim 13, wherein:

the first communication interface is a first Universal Serial Bus protocol (USB) interface, and the second communication interface is a second USB interface.

16. A shipping container for packaging a first electronic device, wherein the first electronic device is a multifunctional peripheral device including one or more of a printer, a copier, and a scanner, and wherein the first electronic device has a housing including a first communication interface, the shipping container comprising:

a second communication interface electrically connectable to the first communication interface, wherein, when the first electronic device is packaged in the shipping container:

the shipping container substantially encloses the first electronic device, and the second communication interface is in electrical communication with the first communication interface such that power and data signals can be communicated via the first and second communication interfaces between the first electronic device and a second electronic device located outside the shipping container the first electronic device comprises a primary controller, a secondary controller, and a selecting unit, the selecting unit is configured to cause the first communication interface to be communicatively coupled to the primary controller or the secondary controller, the secondary controller is configured to receive the power and the data signals, and when the first electronic device is in a powered-down state, the selecting unit is configured to cause the first communication interface to be communicatively coupled to the secondary controller, the power and the data signals are sent to the secondary controller, the secondary controller is powered-up by the sent power, and the secondary controller stores the sent data signals.

17. The shipping container of claim 16, wherein:

the first communication interface is a first Universal Serial Bus protocol (USB) interface, and the second communication interface is a second USB interface.

18. A system comprising:

a first electronic device having a housing, a first controller, a second controller, a selecting unit, and a non-volatile memory having stored thereon firmware for the first electronic device, wherein the first electronic device is a multifunctional peripheral device including one or more of a printer, a copier, and a scanner, and wherein the housing includes a first communication interface, the first electronic device is packaged in a shipping container that substantially encloses the first electronic device, the shipping container includes a second communication interface in electrical communication with the first communication interface such that power and data signals can be communicated via the first and second communication interfaces between the first electronic device and the second electronic device, the first controller controls the non-volatile memory when the first electronic device is powered up, the second controller controls the non-volatile memory when the first electronic device is powered down, and the selecting unit selectively causes the first communication interface to be communicatively coupled to either the first controller or the second controller; and a second electronic device located outside the shipping container, wherein the second electronic device supplies the power and data signals to be communicated to the first electronic device via the first and second communication interfaces, the power and data signals include signals for causing data to be stored in the memory of the first electronic device, the data includes an update to the firmware, and when the first communication interface is communicatively coupled to the second controller, the second controller is configured to receive the signals for causing data to be stored in the non-volatile memory and to cause the data to be stored in the non-volatile memory.

19. The apparatus of claim 1, wherein, when the first electronic device is in a powered-up state, the selecting unit is configured to couple the first communication interface to the primary controller.

20. The apparatus of claim 1, wherein, the secondary controller is configured to recognize whether the second electronic device attempts to program a memory of the first electronic device with unauthorized software.

21. The apparatus of claim 1, wherein, the second communication interface is configured to be covered with a snap-on cover.

* * * * *